(12) United States Patent
Knoedgen

(10) Patent No.: US 9,660,703 B1
(45) Date of Patent: May 23, 2017

(54) ELECTRONIC CIRCUIT AND SYSTEM FOR WIRELESS CHARGING

(71) Applicant: Dialog Semiconductor (UK) Ltd., London (GB)

(72) Inventor: Horst Knoedgen, Munich (DE)

(73) Assignee: DIALOG SEMICONDUCTOR (UK) LIMITED, London (GB)

(*) Notice: Subject to any disclaimer, the term of this patent is extended or adjusted under 35 U.S.C. 154(b) by 0 days.

(21) Appl. No.: 15/146,853

(22) Filed: May 4, 2016

(51) Int. Cl.
*H04B 5/00* (2006.01)
*H04B 1/3827* (2015.01)
*H02J 7/02* (2016.01)
*H02J 7/00* (2006.01)
*H04W 88/06* (2009.01)

(52) U.S. Cl.
CPC .......... *H04B 5/0075* (2013.01); *H02J 7/0081* (2013.01); *H02J 7/025* (2013.01); *H04B 1/385* (2013.01); *H04B 5/0037* (2013.01); *H04W 88/06* (2013.01)

(58) Field of Classification Search
CPC ....... H04B 5/0037; H04B 5/0075; H02J 7/25; H02J 5/005
See application file for complete search history.

(56) References Cited

U.S. PATENT DOCUMENTS

| | | | |
|---|---|---|---|
| 8,855,354 B2 | 10/2014 | He | |
| 9,444,289 B2* | 9/2016 | Park | H02J 17/00 |
| 2008/0212433 A1* | 9/2008 | El Husseini | G11B 7/0948 |
| | | | 369/53.17 |
| 2010/0109445 A1 | 5/2010 | Kurs et al. | |
| 2012/0235636 A1 | 9/2012 | Partovi | |
| 2014/0028107 A1* | 1/2014 | Kwon | H01F 38/14 |
| | | | 307/104 |
| 2014/0159646 A1 | 6/2014 | Sankar et al. | |
| 2014/0241555 A1 | 8/2014 | Terlizzi | |

FOREIGN PATENT DOCUMENTS

EP 1 452 998 A2 9/2004

* cited by examiner

*Primary Examiner* — Tuan Pham
(74) *Attorney, Agent, or Firm* — Haynes and Boone, LLP

(57) ABSTRACT

An electronic circuit for a portable battery-powered electronic device and a related system for wireless charging an electronic circuit for a portable battery-powered electronic device are disclosed. The electronic circuit is operable in a first mode as an actuator and in a second mode as a wireless charging receiver and comprises an electromechanical actuator, a capacitance, and a multi-mode switching circuitry. The electromechanical actuator comprises an inductor. The capacitance is selectively connectable to the inductor, at least in the second mode, to form therewith a resonant circuit for inductively receiving an electromagnetic wireless charging signal. The multi-mode switching circuitry comprises one or more switching devices for switching the electronic circuit between its different modes, wherein at least one of the switching devices is configurable as a rectifying device.

13 Claims, 3 Drawing Sheets

ELECTRONIC CIRCUIT AND SYSTEM FOR
WIRELESS CHARGING

FIELD OF THE INVENTION

The present invention relates to the field of wireless charging of a battery powered device, in particular of a battery-powered portable or "wearable" electronic device. Specifically, the invention is directed to an electronic circuit for a portable battery-powered electronic device, to such a portable device comprising the electronic circuit, and to a related system for wireless charging.

BACKGROUND

In the course of the ongoing digitalization of life, a large variety of different categories of battery-powered portable electronic devices have been conceived, of which the ubiquitous smart phone is only the most prominent one. Further categories comprise, for example, media players, portable computers such as tablet computers, hearing aids, and health and fitness monitoring devices to be worn by a user, e.g. a patient. A particular category, which has recently gained a lot of momentum, is typically referred to as "wearable devices" or in short "wearables". This category comprises, for example, so-called smart watches, fitness tracking devices and other health-related electronic devices, such as health monitoring sensor devices, all of which are designed to be worn by a user, often directly attached to his body. Alternatively, they may for example also be embedded within a piece of clothing, such as a shirt. On the one hand, this allows for providing sensors on the device that are suitable for detecting certain properties or states of the human body, such as the user's current pulse or the humidity of his skin surface. On the other hand, this provides an opportunity to integrate electromechanical actuators within the devices that can silently interact with the user and thus send hidden signals. For example, such an actuator could cause a motion, such as a vibration, that can be sensed by the user wearing the device on his body, e.g. at his wrist, while the motion and any related sounds are difficult or even impossible to be sensed by others. The so-called "tactile engine", used in the Apple Watch® sold by Apple Inc. of Cupertino, is a well-known example of such an actuator. It can, for example, be used to signal an upcoming calendar event to the user by causing a short tapping motion which the user can sense. For the category of cell-phones, the use of electromechanical actuators as vibration alarms has been known for a long time. Loudspeakers comprising an inductor, often referred to as "voice coil", are other examples of electromechanical actuators that are typically used in portable electronic devices. Sometimes, a loud-speaker may even be operated in a particular "overdrive" mode as a vibration device using the voice coil as a moving mass.

For many typical applications, battery-powered portable electronic devices, in particular wearables, feature a stylish design and need to be reasonably rugged and weather-sealed for their intended purpose. For example, it is desirable that smart watches and fitness trackers be sealed and waterproof and thus allow for being used while swimming or diving or in other harsh environments, where the device might get exposed to liquids, materials or even gases, which could potentially cause a malfunction of the device or even damage it, if they were able to penetrate into its interior. Therefore, moving away from using open-plug-type connectors for connecting the portable devices via an electric wire to a power supply, using wireless charging instead has become a recent trend. However, most portable electronic devices have to meet a small form factor as an additional requirement, which poses a significant challenge to the integration of a wireless charging capability requiring additional components. Furthermore, the efficiency of wireless charging may be limited by shielding effects of magnetic materials within the portable device, such as certain metal parts or even permanent magnets.

US 2014/0241555 A1 discloses an electronic device comprising an input-output device such as a speaker, a vibrator, or a near field communications antenna, wherein the input-output device may include an inductor. The inductor in the input-output device may be shared by a wireless charging circuitry in the electronic device so that wireless charging signals can be converted into power to charge a battery in the electronic device. A drive circuit may supply drive signals to the input-output device such as audio signals, vibrator control signals, or near field communications output signals for external near field communications equipment.

SUMMARY

It is an object of the present invention to provide electronic circuits, battery-powered portable electronic devices and charging systems, which have improved wireless charging capabilities.

A first aspect of the present invention is directed to an electronic circuit for a portable battery-powered electronic device. The electronic circuit is operable in a first mode as an actuator and in a second mode as a wireless charging receiver. It comprises an electromechanical actuator, a capacitance, and a multi-mode switching circuitry. Preferably, the capacitance and/or the switching circuitry are implemented in one or more integrated circuits. The electromechanical actuator comprises an inductor, such as a coil. The capacitance, which may be formed from one or more individual capacitor devices, is selectively connectable to the inductor, at least in the second mode, to form therewith a resonant circuit for inductively receiving an electromagnetic wireless charging signal. In particular, the wireless charging signal may be an electromagnetic near-field signal suitable for resonant inductive coupling of the electronic circuit's inductor to a corresponding inductive device of a wireless charging device. The multi-mode switching circuitry comprises one or more switching devices for switching the electronic circuit between its different modes, wherein at least one of the switching devices is configurable as a rectifying device. Preferably, all switching devices are transistors. In the first mode, the switching circuitry is configured to connect the actuator to an electrical power input of the electronic circuit. In the second mode, the switching circuitry is configured as a rectifier circuit for rectifying a voltage induced in the resonant circuit in response to a received electromagnetic wireless charging signal and for providing the rectified voltage at a power output of the electronic circuit as a charging voltage for a battery of the portable electronic device. In the second mode, the at least one configurable switching device is configured as a rectifying device of the rectifier circuit.

As used herein, the term "actuator" refers to a device, for example, an electromechanical device, that is capable of physically acting upon its environment. In particular, an actuator may be a type of motor that is responsible for moving or controlling a mechanism or system. Preferably, an actuator is selected from the following group: a tactile engine, in particular a vibrator, a sound generator, a pressure generator.

Multiple components of the electronic circuit are dual-use components in the sense that they have different functions in the first mode and in the second mode. In particular, the electronic circuit's inductor is used for both driving the actuator in the first mode and as a component of the resonant circuit for receiving a wireless charging signal in the second mode. Furthermore, the at least one switching device in the form of a transistor serves as a switch for switching a connection of the actuator to a power supply in the first mode, while in the second mode it serves as a rectifier for a voltage induced in the resonant circuit in response to a received electromagnetic wireless charging signal. Based on this dual use approach, the total number of components and the form factor requirements of the electronic circuit can be further reduced.

In the following, preferred embodiments of the electronic circuit are described, which can be arbitrarily combined with each other or with other aspects of the present invention, unless such combination is explicitly excluded herein or inconsistent with the explicit teachings set forth herein.

According to a first preferred embodiment the switching circuitry is configured, in the second mode, as a full-wave bridge rectifier circuit for rectifying said voltage induced in the resonant circuit in response to a received electromagnetic wireless charging signal.

Preferably, this is achieved in that the switching circuitry comprises a first and a second voltage divider, each voltage divider having at least two serially connected ones of the switching devices and a connection point there between. In the second mode, the actuator and the capacitance are each electrically connected between said connection points of the first and second voltage dividers. The switching devices of the first and second voltage dividers are transistors, preferably of the MOS-type, each being configurable to operate, in the second mode, as a rectifying diode such that the switching circuitry forms a full-wave rectifier bridge circuit for rectifying the voltage induced in the resonant circuit. Thus, the switching devices of the voltage dividers are dual-use components, switching a connection of the actuator to a power supply in the first mode, while serving in the second mode as rectifiers for a voltage induced in the resonant circuit in response to a received electromagnetic wireless charging signal. Preferably, the switching circuitry is selectively operable, in the second mode, to bring said connection points of the first and second voltage dividers to substantially the same potential, e.g. to a ground respectively mass potential of the electronic circuit, in order to inhibit further wireless charging. Thus, a controlling of a charging operation of the electronic circuit in its second mode can be easily achieved. For example, such controlling may be used for a charge maintenance mode of a battery-powered portable device, in which a charging operation is temporarily paused in order to avoid negative effects that might otherwise occur, for example, if a battery is overheated during charging it, or if a connection of an already fully charged battery to a power supply for charging is continuously maintained.

According to further preferred embodiments, the at least one switching device being configurable as a rectifying device is a MOS-transistor having a gate, a source region, a drain region and a bulk region. At least in the second mode, the bulk region is conductively connected to a first one of the drain and source regions such that a p-n-junction is present between the bulk region and the second one of the source and drain regions, the p-n-junction causing the transistor to act as a rectifier when a voltage is applied between its source region and its drain region and the potential at the gate is selected such that the transistor is switched off. In this way, the bulk diodes of the transistors, which are anyway present in such devices and thus do not require any additional space or manufacturing steps, can be re-used in the second mode as rectifying devices of the rectifying circuit.

According to further preferred embodiments, the resonance frequency of the resonant circuit of the second mode is tunable. In particular, this may be achieved by using tunable capacitors or inductors, i.e. components the capacitance respectively inductance of which can be adjusted to different values. Alternatively, or in addition, tuning the resonance frequency by varying a resistor present within the resonant circuit is possible.

According to related preferred embodiments, the capacitance comprises two or more individual capacitors and at least one configuration switch to selectively connect one or more of the capacitors to the inductor to form therewith the resonant circuit and to adjust its resonance frequency based on the combined effective capacitance of the selectively connected one or more capacitors. Alternatively, or in addition, the inductor may comprise one or more individual inductor elements and at least one configuration switch to selectively connect one or more of the inductor elements together and to the capacitance to form therewith the resonant circuit and to adjust its resonance frequency based on the combined effective inductance of the selectively connected one or more inductor elements. In this way, in the second mode, the efficiency of a wireless charging operation may be adjusted within a range defined between a maximum efficiency and a minimum efficiency. The maximum efficiency corresponds to an optimal resonance, and the minimum corresponds to a maximum dampening effect occurring at a minimal or even absent resonance, and thus a minimal charging effect, if any. This may be advantageously used for controlling a charging voltage or current, in particular depending on a current charging state of a battery to be charged via the electronic circuit.

Furthermore, according to a related preferred embodiment, the electronic circuit comprises a control circuit configured to selectively operate, in the second mode, the at least one configuration switch for adjusting, in accordance with a signal modulation scheme, the resonance frequency of the resonant circuit and thus the dampening of said received wireless charging signal in order to produce a wireless charging signal that is modulated in accordance with the signal modulation scheme. In particular, the modulation scheme may define a communication signal to be transmitted via the modulated wireless charging signal to a charger device providing the received wireless charging signal. For example, if the signal is inductively coupled back to an inductive device of the charger device, the latter can sense the signal as a modulation of the current or voltage at said inductive device and thus receive the communication signal. Preferably, the communication signal is defined as a control signal for communicating control information for the charging operation from the electronic circuit to the charger device.

According to further preferred embodiments, the electronic circuit further comprises a housing or shielding structure that at least partially encloses the inductor and comprises a magnetic material. In particular, the magnetic material may contain a magnetic metal, preferably a ferromagnetic metal such as iron. It may even be magnetized such as to form a permanent magnet. Such a housing or shielding structure may be advantageously used to shield the inductor from undesired impacts from an environment internal or external to the portable device, in particular from electromagnetic fields or waves. Vice versa, it may also be adapted to shield the environment from undesired impacts caused by the inductor. In other cases, the structure is selected for mechanical reasons, for example, to serve as a moving mass of the actuator.

According to further preferred embodiments, the inductor is part of a drive for generating a mechanical motion of a moving mass comprised in the actuator. In particular, the inductor may form a part of a motor for driving a moving mass of a tactile engine or a speaker, e.g. of a linear, circular or other type of vibrator or of a speaker for a portable electronic device, such as a wearable.

A second aspect of the present invention is directed to a portable electronic device comprising a battery and an electronic circuit according to the first aspect, in particular according to any one or more of its embodiments explicitly described above. The output of the electronic circuit is electrically connected to the battery and configured to provide, in the second mode, said rectified voltage to the battery for charging it. Thus, the electronic circuit can be used to drive, in its first mode, an actuator of the portable device, and in its second mode, to enable wireless charging of the portable device.

Accordingly, the advantages of the electronic circuit as described above in connection with the first aspect of the present invention also apply similarly to the device according to the second aspect.

A third aspect of the present invention is directed to a system for wireless charging. The system comprises a portable electronic device according to the second aspect and a charger device. The portable electronic device has a housing or shielding structure that comprises a magnetic material and at least partially encloses the inductor of the electronic circuit of the device. The charger device comprises an induction device for generating a wireless charging signal and providing same to a wireless charging space defined in the surrounding of the charger device. In addition, the charger device comprises a magnet configured to generate a magnetic field extending into the wireless charging space, such that within the wireless charging space there is at least one possible spatial arrangement of the portable electronic device relative to the charger device, where the magnetic field generated by the magnet reduces the magnetic shielding effect of the housing or shielding structure with respect to the wireless charging signal to such an extent that the battery of the device is chargeable by a current induced in the inductor by the wireless charging signal.

Accordingly, the system provides a wireless charging solution based on the idea of using the magnetic field generated by the charger device's magnet to overcome the magnetic shielding effect of the housing or shielding structure, at least partially, during wireless charging by driving the magnetic material comprised in said structure towards or even into magnetic saturation, at least partially. Thus, the magnetic shielding effect of the structure is reduced or even eliminated and the wireless charging signal can thus be received by the inductor of the actuator of the portable device despite the continued presence of the housing or shielding structure. On the other hand, when the charger device is not used for wirelessly charging the portable device, the charger device's magnet may be switched off, if it is an electromagnet. Of course, the portable electronic device may then also be taken and carried away from the charger device. As a result, in both cases, the housing or shielding structure is then no longer exposed to the magnets magnetic field and thus resumes its desired shielding function.

BRIEF DESCRIPTION OF THE DRAWINGS

Further advantages, features and applications of the present invention are provided in the following detailed description and the appended figures, wherein.

DETAILED DESCRIPTION OF PREFERRED EMBODIMENTS

Figure 1:
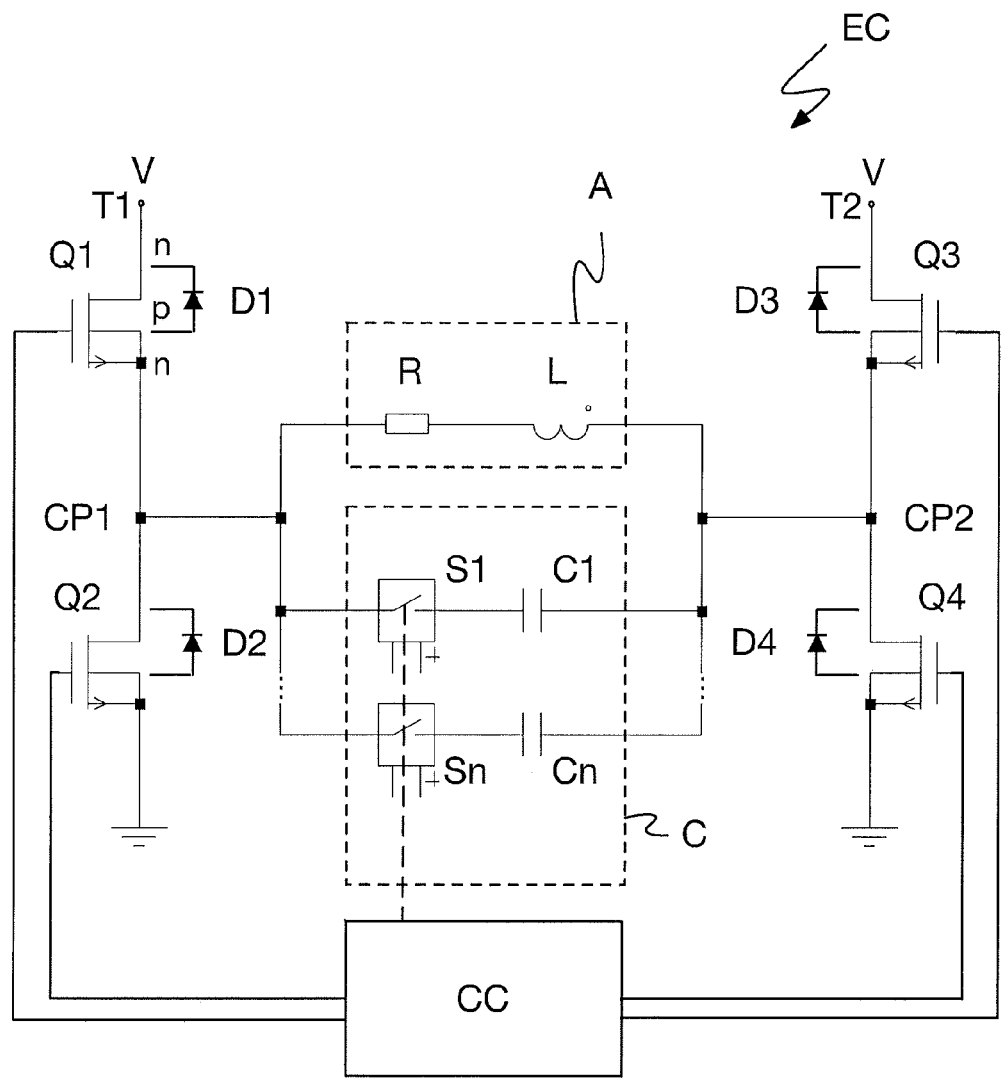
FIG. 1 schematically illustrates an electronic circuit according to a preferred embodiment of the present invention.

Referring to FIG. 1, an electronic circuit EC according to a preferred embodiment of the present invention comprises an electromechanical actuator A, a capacitance C, a multi-mode switching circuitry formed by a set of four MOS-transistors Q1 to Q4 and a control circuit CC. The actuator comprises an inductor L connected in series to a resistor R. An exemplary embodiment of such an actuator A is discussed below in connection with FIG. 2, wherein the flying leads and the ohmic resistance of the coil L form the resistor R. The capacitance C comprises a set of n capacitors C1 to Cn connected in parallel and a corresponding set of configuration switches S1 to Sn, wherein each of the configuration switches S1 to Sn is connected in series to a corresponding one of the capacitors C1 to Cn, such that said respective capacitor Ci (with $i \in \{1, \ldots, n\}$) can be selectively connected to respectively disconnected from the other connected capacitors via its corresponding configuration switch Si. The configuration switches S1 to Sn are controlled by the control circuit CC such that the effective total capacity C can be adjusted respectively tuned by selectively opening respectively closing one or more of the configuration switches S1 to Sn under the control of the control circuit CC. According to further variants (not shown), which may be implemented in addition to or as an alternative to making the capacitance C tunable, the inductor L may comprise two or more individual inductor elements which can be connected, in series or in parallel, via respective configuration switches, in a similar manner as described above for the capacitance C. The inductor L and the capacitance C are connected in parallel between two connection points CP1 and CP2 of the electronic circuit EC. If at least one of the configuration switches S1 to Sn is closed under the control of the control circuit CC, the inductor L and the resulting total capacitance C for a resonant circuit having a resonant frequency which is substantially defined by the values of L, C and R (assuming the configuration switches are essentially ideal, i.e. have at most a neglectable capacitance, inductance and resistance in their closed state). Herein, as is common, a "closed" state of a switch refers to its conducting state, while an "open" state refers to its (essentially) non-conducting state.

The switching circuitry comprises a first voltage divider connected between a first input/output terminal T1 supplied with a supply voltage V and ground/mass and comprising a first MOS transistor Q1 connected in series via the first connection point CP1 to a second MOS transistor Q2. Similarly, the switching circuitry comprises a second voltage divider connected between a second input/output terminal T2 supplied with the supply voltage V and ground/mass, and comprising a third MOS transistor Q3 connected in series via the second connection point CP2 to a fourth MOS transistor Q4. Each of the MOS transistors Q1 to Q4 has a p-doped substrate and n-doped source and drain regions formed therein, i.e. it is of the npn-MOS transistor type, and has its source terminal connected to its bulk terminal, such that between its bulk/source terminal and its drain terminal there is a p/n-junction forming a so-called parasitic "substrate diode" resp. "bulk diode" D1 to D4, as illustrated by respective diode symbols in FIG. 1. Of course, input/output terminals T1 and T2 can be connected to form a single input/output terminal. The same applies for the ground/mass terminals connected to the source terminals of transistors Q2 and Q4.

Under the control of its control circuit CC, the electronic circuit EC can be operated in a first mode, in which it acts as an actuator and driver circuit for same, and in a second mode, in which it forms a wireless charging circuit for a battery that may be connected to the electronic circuit EC, in particular between its input/output terminals T1, T2 and ground/mass. In the first mode, all switches S1 to Sn are in their open state, thus disconnecting the capacitance C from the actuator A. A supply voltage V is provided at the first input/output terminal T1 connected to the drain terminal of transistor Q1. The control circuit CC switches MOS transistors Q1 and Q4 to their conducting state by providing respective gate voltages to the gates of those transistors, while at the same time keeping transistors Q2 and Q3 in a non-conducting state. Accordingly, the first connection point CP1 is brought (essentially) to the voltage level of the supply voltage V, while the second connection point CP2 is brought (essentially) to ground level. Thus, actuator A which is connected between connection points CP1 and CP2 is driven by the supply voltage V and performs an action depending on its type, e.g. creates a vibrating motion of a moving mass inside the actuator. Alternatively, transistors Q1 and Q4 can be brought to the non-conducting state and transistors Q2 and Q3 to the conducting state, while Q3 is connected to the supply voltage V at the second input/output terminal T2. In such case, the actuator A similarly receives the supply voltage V as a driving voltage, although with opposite polarity.

If the control circuit CC puts the electronic circuit EC into its second mode and thus adapts it to become a wireless charging circuit, one or more of the configuration switches S1 to Sn are closed and accordingly a resonant circuit is formed by the resulting parallel connection of the actuator A including its inductor L and the capacitance C. The supply voltage V is disconnected from the electronic circuit EC and all transistors Q1 to Q4 are brought into their non-conducting state. As a result, the electronic circuit DC essentially forms a resonant circuit connected to a rectifier bridge formed by diodes D1 to D4. If the inductor is then exposed to a suitable electromagnetic wireless charging signal adapted to the resonant frequency of the resonant circuit, an alternating voltage is induced within the inductor L and the resonant circuit acts as a (tuned) receiver for said wireless charging signal. Diodes D1 to D4 act as a rectifier bridge, similar to a well-known Wheatstone Bridge, providing a full-wave rectified output voltage between the input/output terminals of the electronic circuit EC and ground/mass, which can be used to charge a battery connected to the electronic circuit. The charging can be stopped, even while the wireless charging signal is still present at the inductor L, by bringing the two connection points CP1 and CP2 to the same voltage, e.g. by bringing transistors Q2 and Q4 to their conducting state and thus connecting both connection points CP1 and CP2 to ground/mass.

Furthermore, since the control circuit CC has the ability to tune the resonance frequency of the resonant circuit of the electronic circuit EC, when the latter is operated in its second mode, a communication channel between the electronic circuit EC and a wireless charger device for supplying the wireless charging signal can be established. For that purpose, the control circuit CC is adapted to modulate the resonance frequency of the resonant circuit, e.g. by selectively operating the configuration switches S1 to Sn according to a defined signal modulation scheme. The energy transferred between the charger device and the electronic circuit by way of inductive coupling depends on the difference between the frequency of the wireless charging signal and the resonance frequency of the receiving resonant circuit of the electronic circuit EC. Therefore, when the resonant circuit's resonance frequency is varied in accordance with the modulation scheme, such modulation can be sensed at the charger device, e.g. by monitoring the current flowing through the charge devices respective induction device. This communication channel may be adapted an used, in particular, to communicate selected status information or control commands between the electronic circuit and the charge device.

Figure 2:
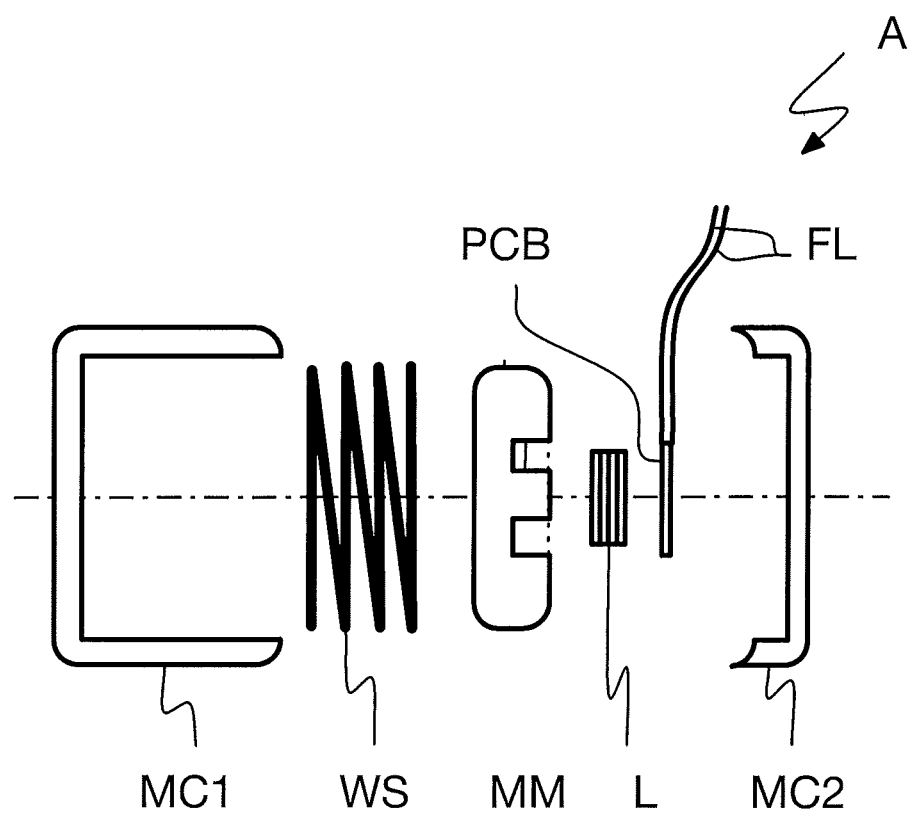
FIG. 2; schematically illustrates an exemplary actuator of an electronic circuit according to a preferred embodiment of the present invention.

FIG. 2 is an exploded assembly drawing of an exemplary actuator A of an electronic circuit EC according to a preferred embodiment of the present invention. In particular, the electronic circuit EC may be designed as described above in connection with FIG. 1. The exemplary actuator A is a linear motor-driven resonant actuator. The actuator A comprises a housing formed from a motor cover MC1 and a motor chassis MC2, which are connectable to form an at least substantially closed container. The housing may be made of a magnetic material, such as iron or a magnetic steel, which is capable of shielding the housing's interior, at least partially, from external magnetic fields. Within the housing, there are aligned along a center line of the housing a wave spring WS, a magnetized moving mass MM made of a ferromagnetic material and loaded by the wave spring WS, an inductor L, e.g. in the form of a voice coil, and a flexible printed circuit board PCB having flying leads FL extending to the outside of the housing and being adapted to connect the actuator A, i.e. its inductor L, via the printed circuit board PCB to a voltage supply for driving it. Typical electrical parameters for the actuator A are $10\Omega$ to $30\Omega$ for the resistor R and $20\,\mu H$ to $250\,\mu H$ for the inductance of the inductor L, but the present invention is not limited to these ranges and other suitable values for R and L may be used instead.

Figure 3:
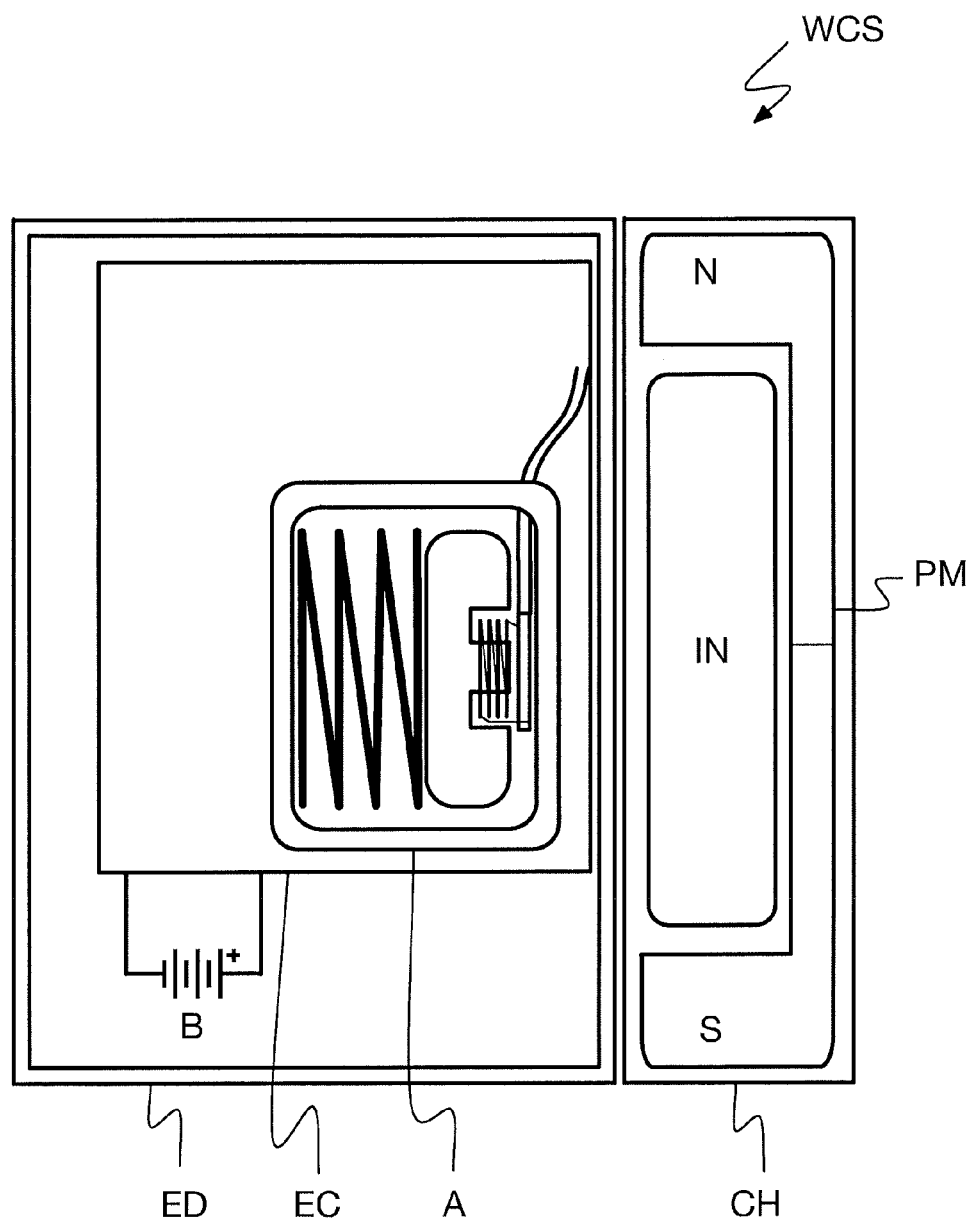
FIG. 3 schematically illustrates a system for wireless charging, comprising a battery-powered portable electronic device and a charger device, according to a preferred embodiment of the present invention.

The actuator A, in its assembled state, is shown in FIG. 3 as a component of the electronic circuit EC. The inductor coil L is located within a ring-shaped grove provided on one principle surface of the moving mass MM such that the inductor coil L surrounds an inner portion of the moving mass that is defined by the grove that forms its boundary. When a suitable voltage V is applied to the inductor coil L via the flying leads FL and the printed circuit board PCB, a flow of electrical current and thus a corresponding magnetic field is generated in the inductor coil L. As a consequence, the moving mass MM, the magnetization of which is aligned with the direction of the magnetic field generated by the inductor coil L, is pushed against the wave spring WS beyond a point, where the resulting force exerted by the wave spring on the moving mass exceeds the magnetic force and pushes the moving mass MM back in the direction of the inductor coil L, thus causing an oscillating linear motion, i.e. a vibration.

Referring now to FIG. 3, a system WCS for wireless charging according to a preferred embodiment of the present invention comprises a battery-powered portable electronic device ED and a corresponding charger device CH. The electronic device which may be, for example, a smart phone, a handheld media player, a tablet computer etc. as described in more detail above, comprises an electronic circuit EC, as described above in connection with FIG. 1.

In particular, the electronic circuit EC may comprise an actuator A, as illustrated in FIG. 2. The electronic circuit is connected to a battery B, which in the first mode of the electronic circuit EC serves as a power supply for the actuator A. When it is operated in its second mode and exposed to a suitable wireless charging signal, it is being charged by the electronic circuit EC. Of course, the electronic device ED typically comprises a large variety of further components, e.g. a memory, processors, one or more displays, wireless circuitry, power management components etc., as is customary for those types of devices. For the purpose of keeping the drawings simple without adding unnecessary complexity, those additional components are not shown in FIG. 3. The charger device comprises an induction device IN that is designed to inductively couple to the electronic devices' inductor L within its actuator A in a resonant manner in order to inductively transfer electrical energy from the charger device CH to the electronic circuit EC of the electronic device ED. In other words, the induction device IN is adapted to generate a wireless charging signal that can be received by the inductor L of the electronic device, when the latter is brought into a charging position relative to the charger device CH, such that the induction device IN and the inductor L are linked via resonant inductive coupling.

In addition, the charger device CH comprises a permanent magnet PM, which is adapted and arranged such that when the electronic device is positioned in a defined wireless charging position relative to the charger device CH and its inductor L is inductively coupled to the induction device IN of the charger device CH, the magnetic field of the permanent magnet PM penetrates the actuator A, i.e. at least its magnetic housing. The magnetic field of the permanent magnet PM is configured to be strong enough to at least partially saturate the magnetic material of the housing of the actuator A and thus reduce the magnetic shielding effect of the housing. Accordingly, the shielding impact on the wireless charging signal generated by the induction device IN is also reduced and the inductive coupling between the induction device IN and the actuator's inductor L is increased. This allows for using housings made from magnetic materials for the actuator A, the electronic device ED, or both, without substantially compromising the quality of inductive coupling between the charger device CH and the inductor L of the electronic device ED and thus the efficiency of the wireless charging of the electronic devices and battery B. It even allows for shielding, by design, the inductor L, the actuator A, the electronic circuit EC or even the electronic device ED as a whole from undesired impacts of external magnetic fields or electromagnetic waves.

While above at least one exemplary embodiment of the present invention has been described, it has to be noted that a great number of variations thereto exists. Furthermore, it is appreciated that the described exemplary embodiments only illustrate non-limiting examples of how the present invention can be implemented and that it is not intended to limit the scope, the application or the configuration of the herein-described apparatus' and methods. Rather, the preceding description will provide the person skilled in the art with constructions for implementing at least one exemplary embodiment of the invention, wherein it has to be understood that various changes of functionality and the arrangement of the elements of the exemplary embodiment can be made, without deviating from the subject-matter defined by the appended claims and their legal equivalents.

What is claimed is:

1. An electronic circuit for a portable battery-powered electronic device, the electronic circuit being operable in a first mode as an actuator and in a second mode as a wireless charging receiver;
    wherein the electronic circuit comprises:
    an electromechanical actuator comprising an inductor;
    a capacitance selectively connectable to the inductor, at least in the second mode, to form therewith a resonant circuit for inductively receiving an electromagnetic wireless charging signal; and
    a multi-mode switching circuitry comprising one or more switching devices for switching the electronic circuit between its different modes, at least one of the switching devices being configurable as a rectifying device, wherein:
    in the first mode, the switching circuitry is configured to connect the actuator to an electrical power input of the electronic circuit; and
    in the second mode, the switching circuitry is configured as a rectifier circuit for rectifying a voltage induced in the resonant circuit in response to a received electromagnetic wireless charging signal and for providing the rectified voltage at a power output of the electronic circuit as a charging voltage for a battery of the portable electronic device, wherein said at least one configurable switching device is configured as a rectifying device of the rectifier circuit.

2. The electronic circuit according to claim 1, wherein, in the second mode, the switching circuitry is configured as a full wave bridge rectifier circuit for rectifying said voltage induced in the resonant circuit in response to a received electromagnetic wireless charging signal.

3. The electronic circuit according to claim 2, wherein:
    the switching circuitry comprises a first and a second voltage divider, each voltage divider having at least two serially connected ones of the switching devices and a connection point therebetween;
    in the second mode, the actuator and the capacitance are each electrically connected between said connection points of the first and second voltage dividers; and
    said switching devices of the first and second voltage dividers are transistors, each being configurable to operate, in the second mode, as a rectifying diode such that the switching circuitry forms a full-wave rectifier bridge circuit for rectifying the voltage induced in the resonant circuit.

4. The electronic circuit according to claim 3, wherein in the second mode the switching circuitry is selectively operable to bring said connection points of the first and second voltage dividers to substantially the same potential in order to inhibit further wireless charging.

5. The electronic circuit according to claim 1, wherein the at least one switching device being configurable as a rectifying device is a MOS-transistor having a gate, a source region, a drain region and a bulk region;
    wherein, at least in the second mode, the bulk region is conductively connected to a first one of the drain and source regions such that a p-n-junction is present between the bulk region and the second one of the source and drain regions, the p-n-junction causing the transistor to act as a rectifier when a voltage is applied between its source region and its drain region and the potential at the gate is selected such that the transistor is switched off.

6. The electronic circuit according to claim 1, wherein the resonance frequency of the resonant circuit of the second mode is tunable.

7. The electronic circuit according to claim 6, wherein:
the capacitance comprises two or more individual capacitors and at least one configuration switch to selectively connect one or more of the capacitors to the inductor to form therewith the resonant circuit and to tune its resonance frequency based on the combined effective capacitance of the selectively connected one or more capacitors; and/or
the inductor comprises one or more individual inductor elements and at least one configuration switch to selectively connect one or more of the inductor elements together and to the capacitance to form therewith the resonant circuit and to tune its resonance frequency based on the combined effective inductance of the selectively connected one or more inductor elements.

8. The electronic circuit according to claim 7, further comprising a control circuit configured to selectively operate, in the second mode, the at least one configuration switch for tuning, in accordance with a signal modulation scheme, the resonance frequency of the resonant circuit and thus the dampening of said received wireless charging signal in order to produce a wireless charging signal that is modulated in accordance with the signal modulation scheme.

9. The electronic circuit according to claim 8, wherein the modulation scheme defines a communication signal to be transmitted via the modulated wireless charging signal to a charger device providing the received wireless charging signal.

10. The electronic circuit according to claim 1, further comprising a housing or shielding structure that at least partially encloses the inductor and comprises a magnetic material.

11. The electronic circuit according to claim 1, wherein the inductor is part of a drive for generating a mechanical motion of a moving mass comprised in the actuator.

12. A portable electronic device comprising:
a battery; and
an electronic circuit according to claim 1;
wherein the output of the electronic circuit is electrically connected to the battery and configured to provide, in the second mode, said rectified voltage to the battery for charging it.

13. A system for wireless charging, comprising:
a portable electronic device according to claim 12 and comprising a housing or shielding structure which comprises a magnetic material and at least partially encloses the inductor of the electronic circuit; and
a charger device comprising:
an induction device for generating a wireless charging signal and providing same to a wireless charging space defined in the surrounding of the charge device; and
a magnet configured to generate a magnetic field extending into the wireless charging space, such that within the wireless charging space there is at least one possible spatial arrangement of the portable electronic device relative to the charger device, where the magnetic field generated by the magnet reduces the magnetic shielding effect of the housing or shielding structure with respect to the wireless charging signal to such an extent that the battery of the device is chargeable by a current induced in the inductor by the wireless charging signal.

* * * * *